(12) United States Patent
Tenstam

(10) Patent No.: US 11,981,373 B2
(45) Date of Patent: May 14, 2024

(54) SYSTEM AND METHOD FOR ADJUSTING AN AIR DEFLECTOR

(71) Applicant: Volvo Truck Corporation, Gothenburg (SE)

(72) Inventor: Anders Tenstam, Öjersjö (SE)

(73) Assignee: Volvo Truck Corporation, Gothenburg (SE)

(*) Notice: Subject to any disclaimer, the term of this patent is extended or adjusted under 35 U.S.C. 154(b) by 362 days.

(21) Appl. No.: 17/577,447

(22) Filed: Jan. 18, 2022

(65) Prior Publication Data
US 2022/0258812 A1 Aug. 18, 2022

(30) Foreign Application Priority Data
Feb. 18, 2021 (EP) .................................. 21157797

(51) Int. Cl.
*B62D 35/00* (2006.01)
*G08C 17/02* (2006.01)

(52) U.S. Cl.
CPC ........... *B62D 35/001* (2013.01); *G08C 17/02* (2013.01)

(58) Field of Classification Search
CPC ...... B62D 35/00; B62D 35/001; B62D 37/02; G08C 17/02
See application file for complete search history.

(56) References Cited

U.S. PATENT DOCUMENTS

| 4,093,300 A | * | 6/1978 | Snizek | B62D 35/001 296/180.2 |
| 4,102,548 A | * | 7/1978 | Kangas | B62D 35/001 296/180.3 |
| 8,496,285 B2 | | 7/2013 | Rogers et al. | |

(Continued)

FOREIGN PATENT DOCUMENTS

| CN | 108473165 A | * | 8/2018 | ........... B62D 35/001 |
| CN | 115396814 A | * | 11/2022 | ......... B60H 1/00657 |

(Continued)

OTHER PUBLICATIONS

Intention to Grant for European Patent Application No. 21157797.8, mailed Jul. 18, 2023, 25 pages.

(Continued)

*Primary Examiner* — Lori Lyjak
(74) *Attorney, Agent, or Firm* — Withrow & Terranova, PLLC

(57) ABSTRACT

A system and method for adjusting an air deflector on a roof of a truck cabin to an optimal position when the truck is connected to a trailer, where the system comprises an air deflector, an electric actuator, and an electronic control unit, where the system further comprises a handheld device provided with stored information of different truck types and a table for different truck-trailer combinations, where the handheld device is adapted to determine a value corresponding to the height of the trailer and a value corresponding to the distance between the truck and the trailer, to determine a set value for the actuator based on the values and the stored (Continued)

information, and to send the set value to the electronic control unit, where the electronic control unit is adapted to set the air deflector in an optimal position by adjusting the actuator in dependency of the set value.

12 Claims, 2 Drawing Sheets

(56) References Cited

U.S. PATENT DOCUMENTS

| | | | | |
|---|---|---|---|---|
| 2011/0093799 | A1* | 4/2011 | Hatambeiki | G11B 27/34 715/763 |
| 2012/0019400 | A1* | 1/2012 | Patel | H04N 21/42204 398/107 |
| 2013/0106587 | A1* | 5/2013 | Reams | G05B 15/02 340/12.52 |
| 2013/0270856 | A1* | 10/2013 | Laudet | B62D 35/001 296/180.3 |
| 2016/0260319 | A1* | 9/2016 | Jeffery | G08C 17/02 |
| 2017/0120964 | A1* | 5/2017 | Kim | B62D 35/001 |
| 2018/0111648 | A1* | 4/2018 | Amar | B62D 35/001 |
| 2024/0025494 | A1* | 1/2024 | Karve | B62D 35/00 |

FOREIGN PATENT DOCUMENTS

| | | | | |
|---|---|---|---|---|
| DE | 102008056357 | A1 * | 5/2010 | ........... B62D 35/001 |
| DE | 102008056357 | A1 | 5/2010 | |
| DE | 102012020697 | A1 * | 4/2013 | |
| DE | 102012020697 | A1 | 4/2013 | |
| DE | 102015002715 | A1 | 9/2015 | |
| DE | 102017203007 | A1 * | 8/2018 | |
| EP | 2626281 | A1 * | 8/2013 | ............. B62D 35/00 |
| EP | 2792579 | A1 * | 10/2014 | ........... B62D 35/001 |
| GB | 2435246 | A * | 8/2007 | ........... B62D 35/001 |
| SE | 0950902 | A1 * | 5/2011 | |
| SE | 1651572 | A1 * | 5/2018 | |
| WO | WO-2007004953 | A1 * | 1/2007 | ........... B62D 35/001 |
| WO | WO-2015030636 | A1 * | 3/2015 | ........... B62D 35/001 |
| WO | WO-2017108076 | A1 * | 6/2017 | ........... B62D 35/001 |

OTHER PUBLICATIONS

Extended European Search Report for European Patent Application No. 21157797.8, mailed Jul. 30, 2021, 9 pages.

* cited by examiner

SYSTEM AND METHOD FOR ADJUSTING AN AIR DEFLECTOR

RELATED APPLICATIONS

The present application claims priority to European Patent Application No. 21157797.8, filed on Feb. 18, 2021, and entitled "SYSTEM AND METHOD FOR ADJUSTING AN AIR DEFLECTOR," which is incorporated herein by reference in its entirety.

TECHNICAL FIELD

The present invention relates to a system and a method for adjusting an air deflector arranged on the driver cabin roof of a truck to an optimal position. The system uses a smartphone for data input.

BACKGROUND ART

Trucks or tractors that are adapted to pull a trailer are often provided with an air deflector or wind deflector. The air deflector is intended to reduce air drag caused by the trailer, when the trailer is higher than the truck. In order to be able to adapt the air deflector to different trailers, the air deflector is adjustable. The front part of the air deflector is attached to the roof of the truck, and the rear part of the air deflector is adjustable in height, i.e. the tilt angle of the air deflector is adjustable.

For some vehicle combinations, where the same truck always pulls the same trailer or the same type of trailer, the air deflector may be either fixed or may be fixedly attached to the roof of the truck. Most trucks do however pull different trailers, sometimes for single transports or for several transports. In these cases, the driver should adjust the air deflector to the specific trailer in order to minimize the total air drag of the vehicle combination and thus to reduce fuel consumption.

In the simplest version, the driver will have to adjust the air deflector manually. The driver must in this case climb up on the roof and adjust the rear struts that holds the air deflector with hand tools, e.g. by loosening some bolts, adjusting the struts and fastening the bolts. The position of the air deflector is often set by experience or by a rule of the thumb. One problem with such a manual adjustment is that it is relatively time consuming, which means that a driver may not adjust the air deflector for a single transport. A further problem is that the air deflector may not be positioned in an optimal manner.

In other cases, the air deflector is also adjusted by hand, but with the aid of a table that outlines the position of the air deflector based on a few measurements. The driver will in this case measure the distance from the cabin to the trailer, e.g. by measuring the distance from the rear rain gutter channel to the front wall of the trailer, and the height of the trailer, i.e. the distance from ground to the roof of the trailer. These measures are then used with the table to determine the correct height of the air deflector. This adjustment method is also relatively time consuming, but ensures that the air deflector is correctly positioned.

Other adjustment systems are automatic, and will adjust the air deflector to an optimal position based on integrated sensors and actuators. In these cases, the adjustment system is provided with one or more sensors that measures different parameters needed for the adjustment of the air deflector. In DE 102008056357 A1, a system comprising one or more sensors is disclosed. A sensor may e.g. measure the distance between the sensor and the front wall of the trailer, the height distance between the sensor and the upper edge of the trailer, or the angle between the sensor and the upper edge of the trailer. These measures are then used to adjust the air deflector to a desired position.

Such a system will often work properly, and will set the air deflector to a proper position. However, such a system is relatively expensive and complicated, and the sensors may sometimes output false values, which sets the air deflector in a wrong position. The sensors are also exposed to environmental conditions, which may cause the sensors to malfunction.

There is thus room for an improved system and method for adjusting an air deflector to an optimal position.

DISCLOSURE OF INVENTION

An object of the invention is therefore to provide an improved method for adjusting an air deflector. A further object of the invention is to provide a system for adjusting an air deflector. A further object of the invention is to provide a truck comprising such a system. An object is also to provide a computer program and a computer program product adapted to perform the steps of the method.

The solution to the problem according to the invention is described in the characterizing part of the independent claims regarding the method, the system and the truck. The other claims contain advantageous further developments of the inventive method and system. Claims for a computer program and a computer program product are also enclosed.

In a method for adjusting an air deflector on a roof of a truck cabin to an optimal position when the truck is connected to a trailer, where the truck comprises an air deflector, an electric actuator and an electronic control unit, the steps of; initiating an adjustment cycle by a handheld device; determining a value corresponding to the height of the trailer by using the handheld device; determining a value corresponding to the horizontal distance between the truck and the trailer by using the handheld device; determining a set value for the actuator by using the determined values, the type of truck and a stored table for different truck-trailer combinations; and sending the set value to the control unit, where the control unit adjusts the air deflector to an optimal position by adjusting the actuator in dependency of the set value are comprised.

By this first embodiment of the method, the optimal position of an air deflector can be set in an easy and reliable manner. The method utilizes a handheld device to determine the required parameters and to determine a set value for the actuator. The set value is sent wirelessly to the control unit, which adjusts the air deflector to the optimal position. The handheld device is preferably a smartphone or a tablet that is provided with a camera, but a dedicated remote control device could also be used. The handheld device communicates with the control unit via a wireless interface, e.g. Wi-Fi, Bluetooth or another wireless radio communication technique. The handheld device uses stored information regarding different truck types and a table for different truck-trailer combinations. The information may be stored in the handheld device or in a remote database. The table gives a set value for the actuator depending on two parameters, a value corresponding to the height of the trailer and a value corresponding the distance between the truck and the trailer.

The information for a truck type gives the start values for the adjustment. From the truck type information, a start value for the determination of the optimal air deflector position is given. The start value is an anchor position of the truck from which the position of the upper front edge of the trailer is calculated. The start value may be any point of the truck, and is in this example the rear rain gutter channel. From this anchor position, the distance to the front wall of the trailer and the vertical height between the anchor point and the roof of the trailer are determined. These values are used by the truck-trailer combination table to determine a set value for the actuator, and thus to adjust the air deflector to an optimal position. The set value for the actuator corresponds to a height position of the air deflector, and thus to an extension value for the actuator. The set value may e.g. be a number representing an extension of the actuator from a start point, e.g. in centimetres, or may represent one of a number of predefined positions of the air deflector. The actuator may be provided with a sensor of some kind adapted to determine the position of the actuator. It would also be possible to measure the extension of the actuator from a start point, e.g. by measuring the number of rotations of an electric motor comprised in the actuator.

The set value for the actuator is determined by the use of a handheld device, e.g. a smartphone, tablet or a dedicated device comprising a camera. Measures corresponding the height of the trailer and to the distance between the truck and the trailer are entered into an application in the handheld device. In one example, a picture of the vehicle combination is used to determine the measurements. The picture is used together with the stored information of the type of truck used. By using information of the truck type, the measurements can be determined even if the anchor position is obscured by parts of the truck, e.g. by side wind deflectors. From the stored information regarding the truck type and the picture of the vehicle combination, the application can obtain the actual size of the truck, and from this the actual height of the trailer can be obtained. The distance between the truck and the front wall of the trailer can also be obtained from the stored information and the picture, since the stored information gives the actual position of the anchor position on the truck. The stored truck information also gives information regarding the type of air deflector used on that truck. These determined measures are used to determine a set value for the actuator, such that the optimal height of the air deflector can be set. The set value is transferred to the electronic control unit of the truck, which in turn drives the actuator to the correct position.

The measurements corresponding to the height of the trailer and to the distance between the truck and the trailer may also be entered into the application by the operator, e.g. if the specification of the truck has changed such that the stored information of the truck type is not correct, or if the front of the trailer is asymmetric such that the application can not determine a height of the trailer. The manual measures may be entered completely by hand, or an offset may be given to measures suggested by the application.

The application may also adapt the suggested measures in dependence of the trailer type. If the trailer is provided with a cooler unit at the upper front wall, this may affect the optimal position of the air deflector. The type of truck may be selected by the operator in a list, or the application may determine the type of truck by e.g. reading the registration number. It would also be possible to store a set of different trailer types and to use the stored information to determine the measures for the vehicle combination. This may e.g. be advantageous for a forwarding firm that uses a set number of different trailer types, or for a driver that only pulls a few different trailers.

BRIEF DESCRIPTION OF DRAWINGS

The invention will be described in greater detail in the following, with reference to the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
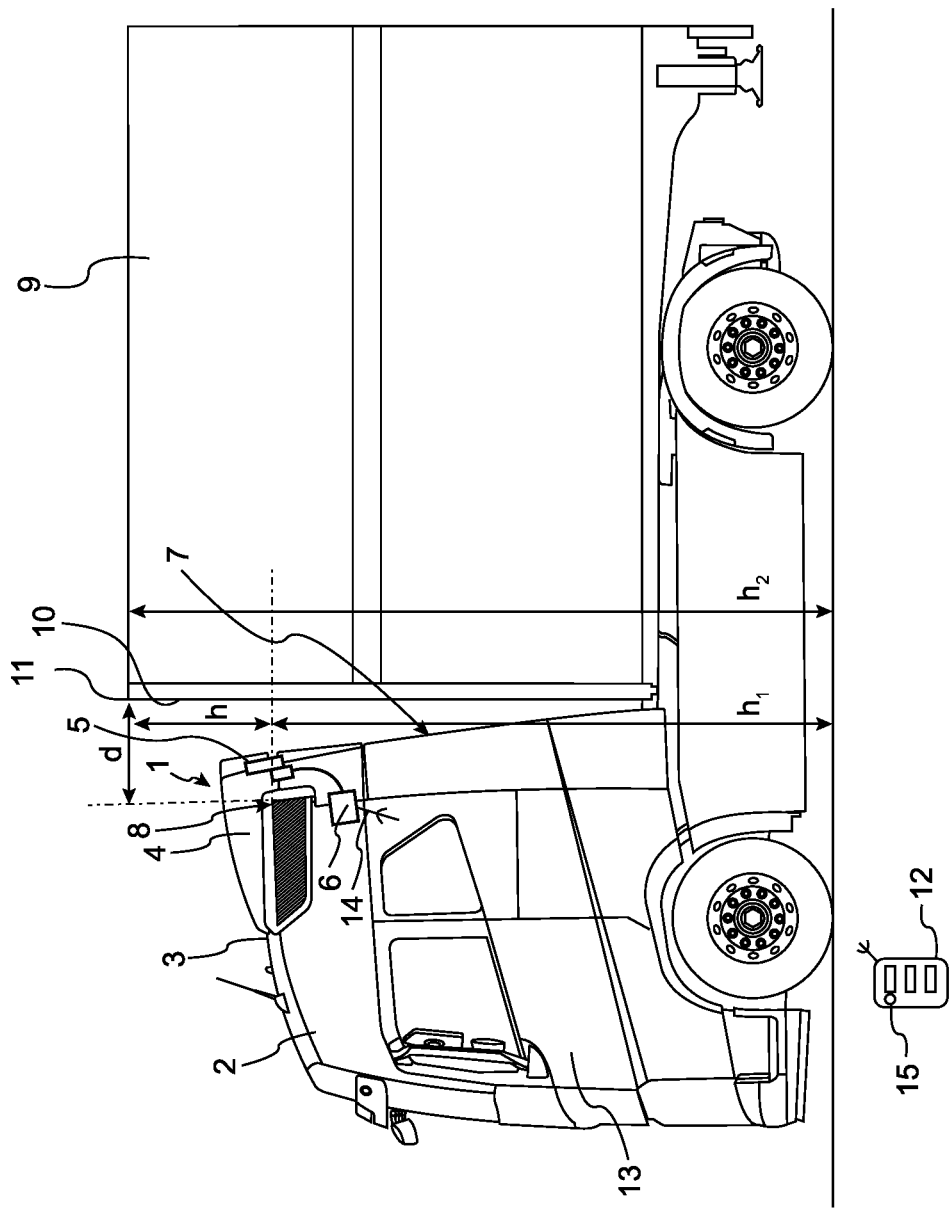
FIG. 1 shows a schematic truck-trailer combination.

FIG. 1 shows a vehicle combination comprising a truck 13 and a trailer 9. The truck may be any type of truck or tractor adapted to pull a semi-trailer coupled to the truck through a fifth wheel. The truck is provided with a cabin 2 having a roof 3 on which an air deflector 4 is mounted. The front of the air deflector is attached to the roof of the truck through a hinged joint, and the rear of the air deflector is attached to the roof through one or more actuators 5. The actuator may e.g. be a linear actuator where the length of the actuator is adjustable. The actuator is controlled by an electronic control unit 6 mounted somewhere on the cabin. The actuator is in the shown example a linear actuator comprising a rotary motor that drives a threaded shaft. The actuator may be provided with a position sensor that can measure the position and thus the extension of the actuator, or the motor may be provided with a rotary sensor that can measure the rotation of the motor such that the extension of the actuator can be determined.

By adjusting the extension of the actuator, the height of the air deflector can be set. In order to reduce fuel consumption and to reduce air drag of the vehicle combination, the height of the air deflector must be optimized with regards to the used truck and the used trailer. The optimal height of the air deflector is determined by the distance between the truck and the trailer and by the height of the trailer. A value corresponding to the distance between the truck and the trailer may be measured in different ways. In the shown example, the horizontal distance from the rear rain gutter channel 8 on the truck to the upper front edge 11 of the trailer is used as the distance d between the truck and the trailer. Other measures may also be used. Since this measure is used as a reference value in a table, the actual value is not important, but it is important that the value is measured in the same way every time.

A value corresponding to the height of the trailer is in the shown example the vertical distance h from the reference point, i.e. the rear rain gutter channel 8, to the upper front edge 11 of the trailer. The height $h_2$ of the trailer is used to determine the vertical distance h between the rear rain gutter channel 8 on the truck and the front edge 11 of the trailer, since the distance $h^1$ between ground and the rear rain gutter channel 8 is known. By using the vertical distance between the rear rain gutter channel and the front edge of the trailer as a reference value in the table, it is not necessary to take account to the driving height of the truck, i.e. to the amount of inflation in the air suspension of the truck.

The optimal position of the air deflector is determined by using a handheld device 12. The handheld device is preferably a smartphone or a tablet that is provided with a camera 15, but a dedicated remote control device could also be used. The handheld device communicates with the electronic control unit 6 via a wireless interface, e.g. Wi-Fi, Bluetooth or another wireless radio communication technique. The electronic control unit is for this purpose provided with a wireless communication means 14. The handheld device is provided with an application adapted to determine the optimal position of the air deflector.

The application of the handheld device uses information regarding different truck types and a table for different truck-trailer combinations. The information may be stored in the handheld device or may be stored in a remote database accessed by the handheld device. The information regarding different truck types comprises information that allows the application to determine different parameters of the actual truck. In this way, the measures of the truck and the air deflector can be obtained without having to measure the truck. These measures can also be used as reference to determine the height of the trailer. This information may comprises one or more of e.g. cab type, chassis number of vehicle, registration number, type of air deflector, type of side air deflector. From this information, the measures of the truck are known.

The handheld device uses an image recognition function to obtain measures from a picture taken by a camera of the handheld device. Since the handheld device has access to all measures of the truck, the position of the rear rain gutter channel used as a reference point can be determined. By having access to the measures of the truck, this reference point can be determined even if the rear rain gutter channel is not visible on the picture. It may e.g. be hidden behind a side wind deflector or other equipment.

One or more of the known measures of the truck can also be used to determine the scale of the picture, such that the height of the trailer can be determined. It is e.g. possible to use the wheel base of the truck or the height of a window to determine the scale. From this, the height of the trailer and the distance between the rear rain gutter channel and the front wall of the trailer can be determined. The height of the trailer can be used to determine the vertical distance h between the rear rain gutter channel and the upper front edge of the trailer.

The measures may be determined automatically by the handheld device. When the measures are determined, a set value is determined by the handheld device by using a stored table for different truck-trailer combinations. Input to the table are values corresponding the distance between the truck and the trailer and the height of the trailer. In the described example, the horizontal distance d between the rear rain gutter channel and the upper front edge of the trailer is used as a value corresponding to the distance between the truck and the trailer. The vertical distance h between the rear rain gutter channel and the upper front edge of the trailer is used as a value corresponding to the height of the trailer. These values are used in the truck-trailer combination table to determine the optimal height of the air deflector. The table will give a set value for the actuator in dependence of the determined values. The set value may e.g. correspond to one of a number of predetermined positions of the air deflector, or may correspond to a length of the actuator.

The set value is transmitted to the electronic control unit. The electronic control unit drives the actuator to a position corresponding to the determined set value. This will in turn set the air deflector to its optimal position for that specific vehicle combination.

The entering of measures corresponding to the distance between the truck and the trailer and to the height of the trailer into the application may be automatic and may be determined from the type of truck and the picture. In one example, the application suggests the values to the operator, and the operator can confirm the values. If the operator does not confirm the suggested values, the operator may input an alternative value before the values are confirmed.

In one example, the operator can measure both values manually and can enter both values into the application. This could be the case if the camera can not obtain a picture, or if the truck has been altered after the delivery, such that the stored truck parameters are not correct. It is e.g. possible that another type of air deflector has been mounted to the truck. This function can also be used if the front wall of the trailer is not flat or for a circular trailer.

In one example, the parameters of one or more trailers may also be stored, either in the handheld device or in a database. This is especially useful for companies having a limited amount of different trailers, or for an operator that regularly pulls the same trailers. The type of trailer can then be selected in a menu in the handheld device.

Figure 2:
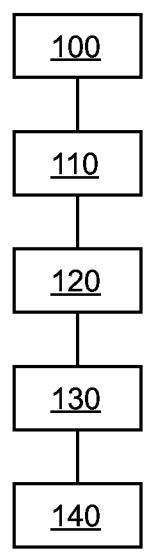
FIG. 2 shows a schematic flow chart of the inventive method.

FIG. 2 shows a schematic flow chart of one example of the method for adjusting an air deflector on a roof of a truck cabin to an optimal position. The truck is connected to a trailer through a fifth wheel, and the truck comprises an air deflector, an electric actuator and a control unit. The method is preferably performed when the driving height of the truck is reached, but may also be performed before the truck engine is started.

In step 100, the adjustment cycle is initiated by using a handheld device. The handheld device is preferably a smartphone provided with a camera, where the method is performed by an application in the handheld device.

In step 110, a value corresponding to the height of the trailer is determined by using the handheld device. This value may e.g. be the actual height of the trailer, or may be the vertical distance from a reference point of the truck to the upper front edge of the trailer. This value is used as an input value to a stored table.

In step 120, a value corresponding to the distance between the truck and the trailer is determined by using the handheld device. This value may e.g. be the horizontal distance from a reference point of the truck to the upper front edge of the trailer, or the distance from the rear wall of the truck to the front wall of the trailer. This value is used as an input value to a stored table.

In step 130, a set value for the actuator is determined by using the determined values, the type of truck and a stored table for different truck-trailer combinations. The values corresponding to the height of the trailer and the horizontal distance between the truck and the trailer are entered into the table, from which a set value for the actuator is obtained. The stored information regarding the type of truck comprises one or more of: cab type, chassis number of vehicle, registration number, type of air deflector, type of side air deflector. The stored information regarding the type of truck may be stored in the handheld device or in a remote database. The table for different truck-trailer combinations may be stored in the handheld device or in a remote database.

In step 140, the set value is sent to the control unit, where the control unit adjusts the air deflector to an optimal position by adjusting the actuator in dependency of the set value. The set value is transmitted to the electronic control unit in a wireless manner. When the air deflector is set to the optimal position, the control unit may give a feedback signal to the handheld device confirming that the optimal position has been reached, or may give an error message if the optimal position could not be set.

The invention is not to be regarded as being limited to the embodiments described above, a number of additional variants and modifications being possible within the scope of the subsequent patent claims.

The invention claimed is:

1. A method for adjusting an air deflector, comprising:
   initiating, by a handheld device, an adjustment cycle by a handheld device,
   determining, by the handheld device, a value corresponding to a height of a trailer by using the handheld device, the trailer connected to a truck,
   determining, by the handheld device, a value corresponding to a horizontal distance between the truck and the trailer by using the handheld device,
   determining, by the handheld device, a set value for an electric actuator of the truck by using the determined values, a type of truck, and a stored table for different truck-trailer combinations, and
   sending, by the handheld device, the set value to a control unit of the truck, where the control unit adjusts an air deflector on a roof of a truck cabin of the truck to an optimal position by adjusting the actuator in dependency of the set value.

2. The method of claim 1, wherein the value corresponding to the height of the trailer and the value corresponding to the horizontal distance between the truck and the trailer are determined by using a camera and an image recognition function in the handheld device.

3. The method of claim 2, wherein the handheld device proposes values corresponding to the height of the trailer and to the horizontal distance between the truck and the trailer to an operator, where the operator can accept the proposed values before the air deflector is adjusted.

4. The method of claim 3, wherein the operator can modify the proposed values before the air deflector is adjusted.

5. The method of claim 1, wherein the value corresponding to the height of the trailer and the value corresponding to the horizontal distance between the truck and the trailer are measured manually by an operator, and that the operator inputs the measured values to the handheld device.

6. The method of claim 1, wherein a list of different types of trucks are stored in the handheld device, and wherein the actual type of truck is selected by an operator.

7. The method of claim 1, wherein a list of different types of trucks are stored in the handheld device, and wherein the actual type of truck is determined from a registration number of the truck.

8. The method of claim 1, wherein a list of different types of trailers are stored in the handheld device, and wherein the actual type of trailer is selected by an operator.

9. The method of claim 1, wherein the table for different truck-trailer combinations is stored in the handheld device.

10. A system, comprising:
    an air deflector on a roof of a truck cabin of a truck,
    an electric actuator of the truck,
    an electronic control unit of the truck, the electronic control unit provided with wireless communication, and
    a handheld device provided with stored information of different truck types and a table for different truck-trailer combinations,
    wherein the handheld device is configured to:
       determine a value corresponding to a height of the trailer and a value corresponding to a distance between the truck and the trailer,
       determine a set value for the actuator based on the values and the stored information, and
       send the set value to the electronic control unit, where the electronic control unit is adapted to set the air deflector in an optimal position by adjusting the actuator in dependency of the set value.

11. The system of claim 10, wherein the handheld device comprises an image recognition function adapted to use a camera of the handheld device to determine the value corresponding to the height of the trailer and the value corresponding to the distance between the truck and the trailer.

12. The system of claim 10, wherein the handheld device comprises an input function adapted to receive manually measured values corresponding to the height of the trailer and the distance between the truck and the trailer from an operator.

* * * * *